United States Patent [19]
Zucker

[11] Patent Number: 6,101,550
[45] Date of Patent: Aug. 8, 2000

[54] METHOD AND STRUCTURE FOR INTERRUPT POLLING SIGNAL BANDWIDTH ALLOCATION IN UNIVERSAL SERIAL BUS (USB) SYSTEM

[75] Inventor: J. Steven Zucker, Manhattan Beach, Calif.

[73] Assignee: Sun Microsystems, Inc., Palo Alto, Calif.

[21] Appl. No.: 08/814,585

[22] Filed: Mar. 10, 1997

[51] Int. Cl.[7] ..................................................... G06F 15/16
[52] U.S. Cl. .......................... 709/241; 709/241; 709/239; 709/240; 709/242
[58] Field of Search .......................... 395/200.52, 200.56, 395/200.83, 200.82, 200.89, 800.28, 800.3, 283, 284, 287; 370/477, 449–457, 532, 545; 340/825.02, 825.08; 709/200–253

[56] References Cited

U.S. PATENT DOCUMENTS

| | | | |
|---|---|---|---|
| 5,471,474 | 11/1995 | Grobicki | 370/85.2 |
| 5,513,368 | 4/1996 | Garcia, Jr. | 395/842 |
| 5,802,318 | 9/1998 | Murray | 395/280 |
| 5,832,300 | 11/1998 | Lowhert | 395/853 |
| 5,832,492 | 11/1998 | Wooten | 707/101 |

OTHER PUBLICATIONS

OpenHCI "Open Host Controller Interface Specification for USB", Compaq Microsoft National Semiconductor Jun. 22, 1997, pp. 67, 68 & 70.

OpenHCI "Open Host Specification for USB", http://www.microsoft.com/hwdev/respec/bussspes.htm, Compaq, Microsoft, National Semiconductor, pp. 54–79, Oct. 1996.

Primary Examiner—Meng-Ai T. An
Assistant Examiner—Stacy Whitmore
Attorney, Agent, or Firm—David G. Alexander; Arter & Hadden LLP

[57] ABSTRACT

A Universal Serial Bus (USB) controller includes an allocation unit configured to allocate bandwidths to a plurality of nodes in a polling list, each node being capable of storing at least one descriptor representing a respective polling signal. The nodes are arranged in a binary tree structure having a plurality of leaf nodes, a root node, and at least one level of intermediate nodes which are successor nodes for the leaf nodes and predecessor nodes for the root node. The allocation unit is configured to store variables P and S for each node, where P is a maximum bandwidth of polling signals entering a node from predecessor nodes, and S is a sum of bandwidths of polling signals represented by descriptors stored in the node and all successor nodes thereof. It assigns a new device to a node such that a maximum value of P+S for the nodes at each level is minimized. The allocation unit adds a descriptor representing a new polling signal to a node in a specified level which has a minimum value of P+S. After adding a descriptor to a node, the allocation unit alters values of S for the node and all predecessor nodes thereof by adding the bandwidth of the new polling signal represented by the descriptor to the values of S, and alters values of P for successor nodes thereof in accordance with the bandwidth of the polling signal represented by the descriptor.

26 Claims, 7 Drawing Sheets

| NODE | P | S |
|---|---|---|
| 1 | 11 | 6 |
| 2 | 6 | 10 |
| 3 | 9 | 8 |
| 4 | 6 | 10 |
| 5 | 0 | 11 |
| 6 | 4 | 13 |
| 7 | 0 | 11 |
| 8 | 0 | 16 |
| 9 | 0 | 13 |
| 10 | 0 | 11 |
| 11 | 0 | 11 |
| 12 | 0 | 14 |
| 13 | 0 | 17 |
| 14 | 0 | 11 |
| 15 | 0 | 11 |

METHOD AND STRUCTURE FOR INTERRUPT POLLING SIGNAL BANDWIDTH ALLOCATION IN UNIVERSAL SERIAL BUS (USB) SYSTEM

BACKGROUND OF THE INVENTION

1. Field of the Invention

The present invention generally relates to the art of digital computer systems, and more specifically to a method and structure for interrupt polling signal bandwidth allocation in a universal serial bus system.

2. Description of the Related Art

Digital Personal Computers (PC) have been conventionally provided with a number of connectors for connection to peripheral units, such as a monitor, keyboard, mouse, printer, modem, etc. Until recently, the connectors have had a variety of configurations, including number of pins, shape, and interface type (e.g. serial, parallel). This unnecessarily increases the complexity and cost of the computer system, since the computer must be able to accommodate and integrate the different interface and connector types.

A conventional PC serial bus is limited to a data transfer rate of approximately 115 kilobits/sec. This is far below the speed which is required by new expansion options such as telephony, multimedia, and high speed storage devices.

A standard called "Plug and Play" has been introduced which is intended to automatically identify and configure peripheral components such as modems, sound cards, etc. that are plugged into a computer via internal slots. This expedient is limited to internal components, and cannot be extended to external peripherals such as printers.

In addition, Plug and Play systems often fail to identify components, or identify them incorrectly, causing a system configuration problem which is more complicated to deal with than the manual configuration procedure which Plug and Play is intended to eliminate.

A new system has emerged which overcomes the drawbacks of the conventional multi-interface arrangement, as well as Plug and Play. The system is entitled "Universal Serial Bus (USB)", and is implemented by a register level interface standard entitled "Open Host Controller Interface (OHCI)" which is being developed by a consortium of computer industry manufacturers. The system is a bus having a unitary interface type, and the same physical connectors at all levels.

Another host controller system has been introduced by Intel, which is entitled "Universal Host Controller Interface (UHCI)".

USB enables a wide variety of peripherals to be connected through a single physical connector at the back of PC, thereby replacing the multiple ports which are currently required. This is accomplished by having several peripheral units connected to one another in a tree-like configuration.

A hub is an intelligent wiring connector that connects to the PC (or to another hub upstream), and provides attachment for additional peripheral units.

USB enables bi-directional isochronous and asynchronous transfer rates of up to 12 megabits/sec over the same set of wires, making it possible for a single PC controller to link up with up to 63 digital peripherals such as a mouse, modem, speaker, joystick, laptop or handheld computer, telephone system, headset, etc.

The USB system provides for automatic identification and configuration of compatible external as well as internal peripheral units, thereby overcoming the limitations of Plug and Play. When a peripheral is added to the system (this can occur "hot" while the system is up and operating), it is identified and automatically added to a data structure which is maintained by the controller software. The data structure identifies the unit by a unique identifier code, and includes entries for communicating with the unit in accordance with its individual requirements.

The data structure includes data specifying four types of data transfers which can be performed between the controller and the peripheral units: interrupt transfers, isochronous transfers, control transfers, and bulk transfers.

Interrupt transfers, to which the present invention relates, are implemented by periodically polling the peripheral units at intervals which depend on the individual requirements. In response to being polled, a peripheral unit returns data to the controller representing the result of performing a specific action, e.g. the result of a keyboard key press. The controller passes the data from the peripheral unit to the PC memory for suitable processing.

Different types of peripheral units have different polling interval requirements. In the OHCI system, polling intervals are defined relative to a series of 32 "frames", each of which has a fixed period of 1 millisecond. A peripheral unit can be polled every millisecond, or at power-of-two multiples of 1 millisecond. The UHCI system can use any power of two, although it is practically limited to 1,024 ms.

The data specifying the polling structure for the peripheral units is stored in a polling list which is arranged in a binary tree configuration. The tree has nodes which are arranged at levels that correspond to powers of two. Data for peripheral units which must be polled every millisecond is located at the root node of the tree; data for peripheral units which must be polled every two milliseconds is stored in the first predecessor level from the root node, etc.

The data for each peripheral unit has a certain "bandwidth", which can be specified as bytes of data, percentages of a frame period, etc. For example, one peripheral unit may require transfer of 10 bytes of data upon being polled, another peripheral unit may require 5 bytes, another may require 25 bytes, etc.

The USB system itself has an inherent bandwidth limitation in that the time (bandwidth) required to transfer all data within each frame cannot exceed the frame period of 1 millisecond. In addition, it is desirable to allocate the bandwidths to the multiple paths of the tree structure such that the paths have approximately equal bandwidths.

An implementation of the USB standard is described in a publication entitled "Open HCI Open Host Controller Interface Specification for USB, Compaq, Microsoft, National Semiconductor, Jan. 22, 1997 2:28 PM Release:1.0a". Section 5.2.7.2.1 of this document presents a method for allocating newly added peripheral units to nodes in the polling list, and thereby allocating bandwidths to the paths of the tree structure.

The method uses a "brute force" approach, which involves calculating the maximum bandwidth for every path in the tree from the input or leaf nodes through the root node, and adding a new peripheral unit to the node of the required level which has the lowest calculated bandwidth.

This method is inefficient in that it requires an unnecessarily large amount of calculation, translating into an unnecessarily large amount of time for which the system is unavailable for performing other tasks.

SUMMARY OF THE INVENTION

The present invention overcomes the drawbacks of the prior art by providing a structure and method for allocating bandwidths in a Universal Serial Bus (USB) which operates on only a limited portion of a polling list tree structure, and thereby substantially reduces the complexity and computer system time required for bandwidth allocation.

A computer system according to the present invention includes a computer, a plurality of peripheral units, a USB bus connecting the computer to the peripheral units, and a controller configured to send periodic polling signals to the peripheral units, each polling signal having a specified bandwidth.

The controller includes an allocation unit configured to allocate bandwidths to a plurality of nodes in a polling list, each node being capable of storing at least one descriptor representing a respective polling signal. The nodes are arranged in a binary tree structure having a plurality of leaf nodes, a root node, and at least one level of intermediate nodes which are successor nodes for the leaf nodes and predecessor nodes for the root node.

The allocation unit is configured to store variables P and S for each node, where P is a maximum bandwidth of polling signals entering a node from predecessor nodes, and S is a sum of bandwidths of polling signals represented by descriptors stored in the node and all successor nodes thereof. It assigns a new device to a node such that a maximum value of P+S for the nodes at each level is minimized.

The allocation unit adds a descriptor representing a new polling signal to a node in a specified level which has a minimum value of P+S. After adding a descriptor to a node, the allocation unit alters values of S for the node and all predecessor nodes thereof by adding the bandwidth of the new polling signal represented by the descriptor to the values of S, and alters values of P for successor nodes thereof in accordance with the bandwidth of the polling signal represented by the descriptor.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
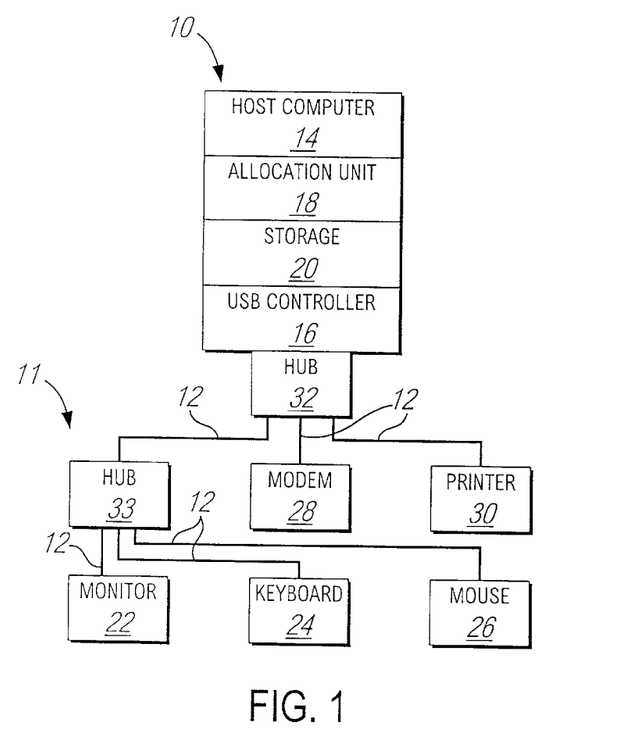
FIG. 1 is a block diagram of a computer system including a Universal Serial Bus (USB) according to the present invention.

As illustrated in FIG. 1, a computer system 10 according to the present invention includes a plurality of units which are interconnected by a Universal Serial Bus (USB) 11. The system 10 includes a host computer 14 which is typically a workstation implemented by a conventional Personal Computer (PC).

The computer 14, although not illustrated in detail, includes a motherboard having a processor, volatile and non-volatile data storage, input-output devices, etc. The computer 14 is provided with a USB controller 16 for controlling data transfers through the bus 11. A bandwidth allocation unit 18 according to the present invention, together with a storage 20 for storing list and table data required by the controller 16 and unit 18, are also illustrated. It will be noted that the storage 20 can be part of the conventional memory architecture of the computer 14.

The allocation unit 18 is associated with the controller 16 as will be described in detail below, and can be an integral component thereof. The controller 16 and allocation unit 18 can be implemented in hardware, software, or any combination thereof.

Any part or all of these units can be implemented as a computer program including instructions which are stored on a digital data storage medium such as a magnetic disk or CD ROM for distributing to end users in accordance with the present invention. Further, any part or all of these units can be wholly or partially implemented in volatile memory, non-volatile memory, or any combination thereof prior to and during operation.

As illustrated, a number of peripheral units are connected to the host computer 14 via the USB bus 11. In the example shown, a modem 28 and printer 30 are connected via lines 12 to a USB hub 32, which is itself connected to the USB controller 16. A monitor 22, keyboard 24 and mouse 26 are connected through lines 12 to another hub 33, which is itself connected through a line 12 to the hub 32.

The USB controller 16 communicates with the peripheral units shown via the USB bus 11 using four types of data transfers: interrupt transfers, isochronous transfers, control transfers, and bulk transfers. The USB bus 11 itself includes the hubs 32 and 33, and the lines 12.

Interrupt transfers, to which the present invention relates, are initiated by the controller 16 which periodically polls the peripheral units at intervals which depend on the individual requirements. In response to being polled, a peripheral unit returns data to the controller 16 representing the result of performing a specific action, e.g. the result of depressing a key on the keyboard 24. The controller 16 passes the data from the peripheral unit to the computer 14 for suitable processing. If a device, typically a keyboard or mouse, does not have data to transmit, it responds with a negative acknowledgement (NAK) message.

Different types of peripheral units have different polling interval requirements. Polling intervals are defined relative to a series of "frames", each of which has a fixed period of 1 millisecond. A peripheral unit can be polled every millisecond, or at power-of-two multiples of 1 millisecond.

Figure 2:
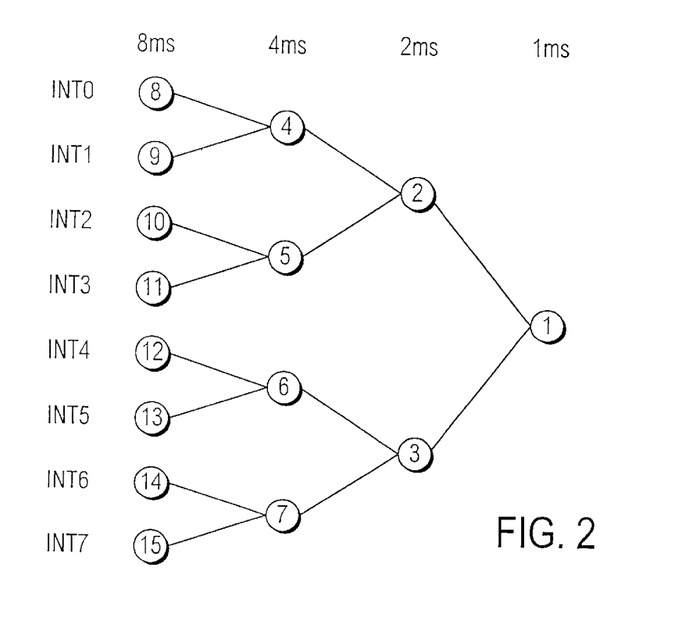
FIG. 2 is a diagram illustrating a binary tree structure for configuring an interrupt polling list according to the invention.

The data specifying the polling structure for the peripheral units is stored in a polling list which is arranged in a binary tree configuration as illustrated in FIG. 2. The tree has nodes which are arranged at levels that correspond to powers of two. Data for peripheral units which must be polled every millisecond is located at the root node of the tree; data for peripheral units which must be polled every two milliseconds is stored in the first predecessor level from the root node, every four milliseconds at the second predecessor level, etc.

FIG. 2 is a simplified example of the binary tree structure as implemented by the OHCI controller. The drawing illustrates a tree having four levels, and nodes which are indicated by circles. The nodes have numbers which are located inside the circles. There is one root node which is designated as "1", and provides interrupt polling signals every 1 millisecond. There are two nodes at the second level designated as "2" and "3", which provide interrupt polling signals every 2 milliseconds.

There are four nodes at the third level designated as "4 to 7", which provide interrupt polling signals every 4 milliseconds, and eight nodes at the fourth or leaf level designated as "8 to 15", which provide interrupt polling signals every 8 milliseconds.

In summary, the first level (1 millisecond period) consists of the root node 1; the second level (2 millisecond period) consists of the nodes 2 and 3; the third level (4 millisecond period) consists of the nodes 4 to 7; and the fourth level (8 millisecond period) consists of the nodes 8 to 15.

Interrupt polling signals INT0 to INT7 are applied to the input or leaf nodes 8 to 15 which propagate rightwardly to and through the root node 1. The signals INT0 to INT7 are applied at successive 1 millisecond intervals or frame periods. For example, the signal INT1 is applied to the node 9 one millisecond after the signal INT0 is applied to the node 8.

Each node leftward of a specified node is a "predecessor node", of that node, whereas each node rightward of a specified node is a "successor node" of that node. It will be noted that the leaf nodes 8 to 15 do not have predecessor nodes, whereas the root node 1 does not have a successor node.

The OHCI system as currently implemented includes two additional levels of nodes, providing additional periods of 16 and 32 milliseconds respectively. The simplified arrangement of FIG. 2 is sufficient, however, to present the concepts of the invention without cluttering the drawing.

Figure 3:
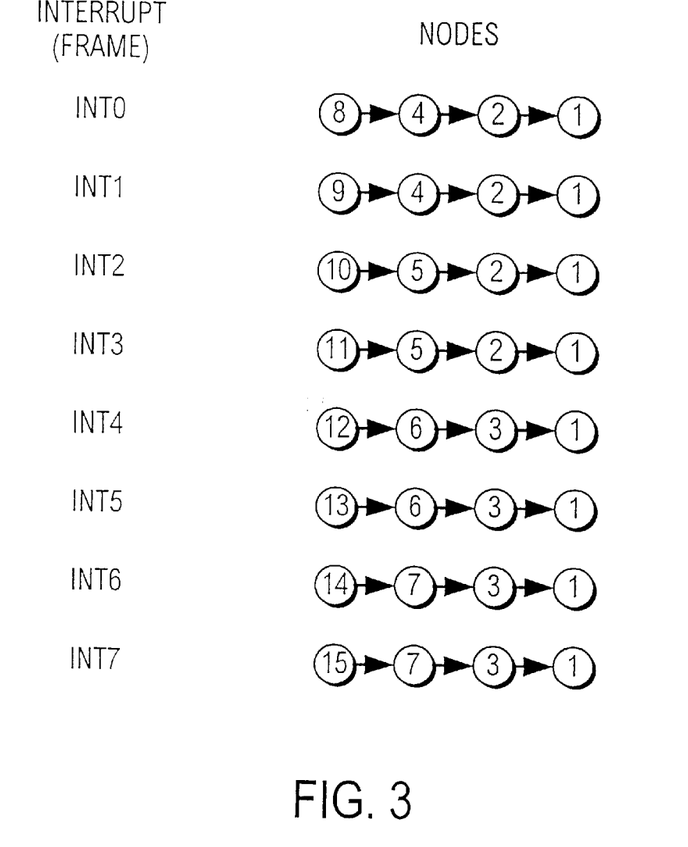
FIG. 3 is a simplified diagram illustrating an interrupt polling list configured according to the tree structure of FIG. 2.

The binary tree arrangement of FIG. 2 maps to a polling list, referred to in the OHCI system as an "endpoint descriptor list", which is stored in the controller 16 and/or the allocation unit 18 and illustrated in FIG. 3. There are 8 paths through the tree of FIG. 2 from the leaf nodes 8 to 15 respectively to the root node 1. The path from leaf node 8 for the signal INT0 traverses the nodes 8, 4, 2, and 1. The path from the leaf node 14 for the signal INT6 traverses the nodes 14, 7, 3, and 1, etc.

It will be noted that the root node 1 is included in all of the paths, the second level nodes 2 and 3 are included in half of the paths, the third level nodes 4 to 7 are included in two paths each, and the fourth level nodes are included in one path each.

In the USB system, the nodes of FIGS. 2 and 3 are referred to as "interrupt endpoint descriptor placeholders", and can contain any number, including zero, of "Endpoint Descriptors" (ED). An ED is a specification of a peripheral unit, including an identification number and other information.

Figure 4:
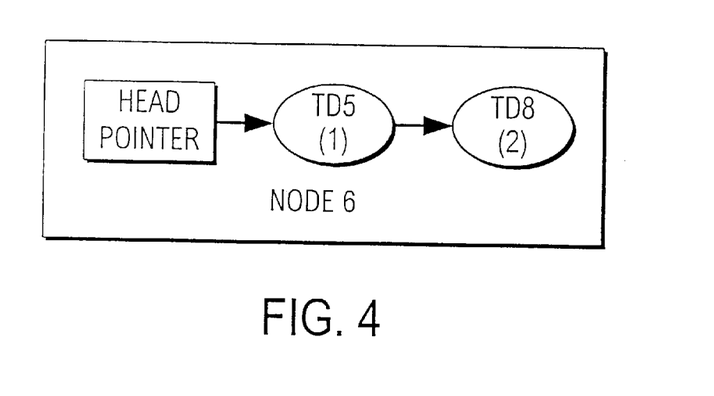
FIG. 4 is a block diagram illustrating an exemplary node of the tree structure of FIG. 2.

FIG. 4 illustrates the contents of an exemplary interrupt endpoint descriptor placeholder or node. The node includes a head pointer which points to the head of one or more "Transfer Descriptors" (TD) queues. Each TD includes one or more bytes of data which represent the interrupt polling data which is to be sent from the controller 16 over the bus 11 to the peripheral units.

In the example of FIG. 4, the node 6 includes a head pointer which points to a queue of TDs including TD5 and TD8 which designate peripheral units that are identified by the numbers "5" and "8" respectively. The interrupt polling signals which are to be transferred from the controller 16 to the peripheral unit with the identification number "15" is represented by TD5. The signals for the peripheral unit "8" are represented by a single TD8.

The data for each peripheral unit has a certain "bandwidth", which can be specified as bandwidth units such as bytes of data, percentages of a frame period, etc. For example, one peripheral unit may require transfer of 10 bytes of data upon being polled, another peripheral unit may require 5 bytes, another may require 25 bytes, etc.

In the example of FIG. 4, the TD5 has a bandwidth of (1) unit, whereas the TD8 has a bandwidth of (2) units. Thus, the node 6 has a total bandwidth of (3) units.

Figure 5:
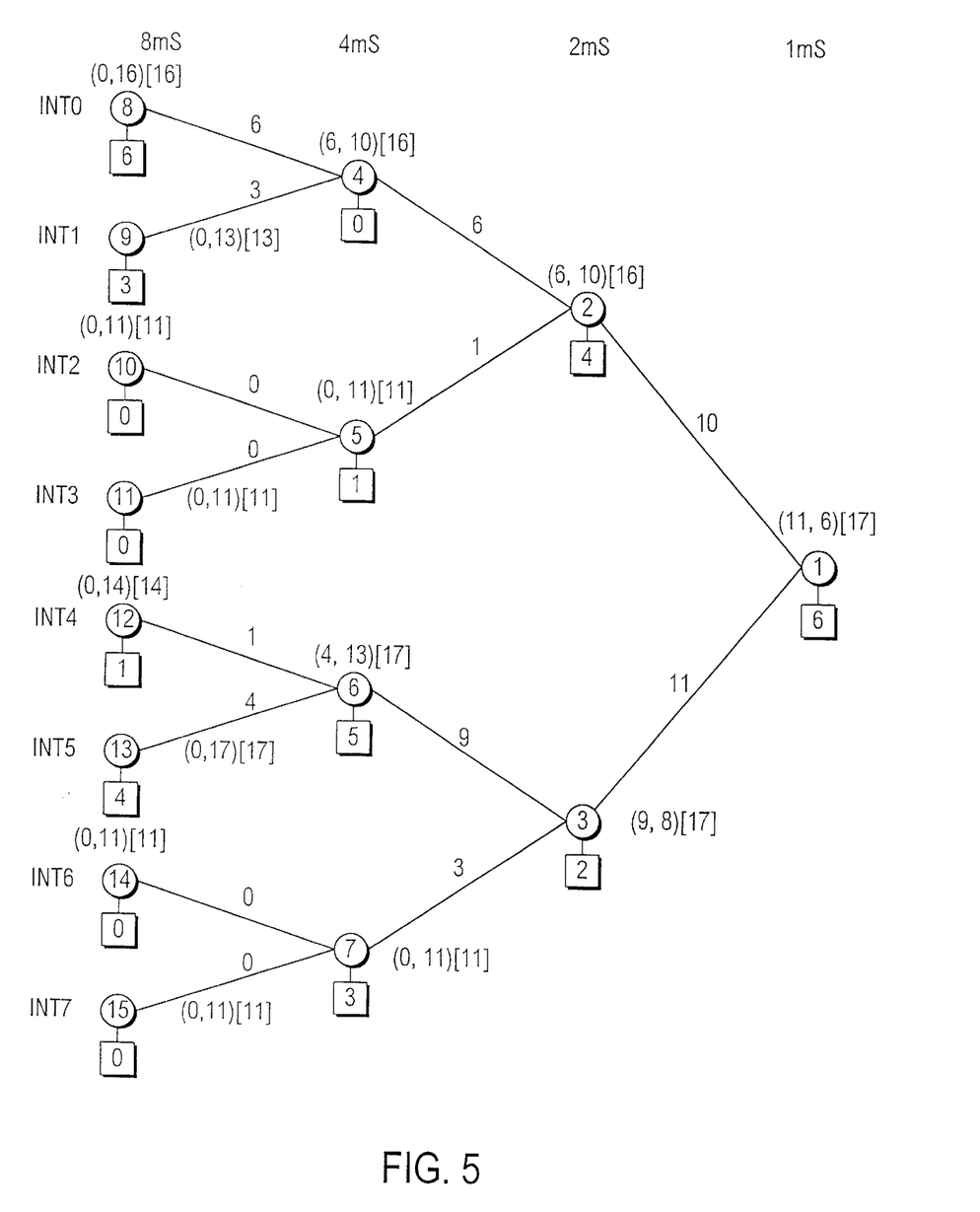
FIG. 5 is a diagram illustrating an exemplary tree structure including additional data according to the present invention.

FIG. 5 is a diagram which generally corresponds to that of FIG. 2. However, FIG. 5 includes additional data which is used for practicing the present invention.

The drawing illustrates a binary tree having nodes represented by the same numbers used in FIG. 2. However, three variable parameters P, S, and MAX are listed for each node in the format (P,S) [MAX]. The parameter MAX is equal to the sum of P and S, and is redundant to the actual practice of the invention since it can be quickly calculated as P+S. However, the value MAX is included in FIG. 2 for its significance in understanding the invention as will be described in detail below.

FIG. 5 also includes variable parameters which are associated with the paths between nodes and designated as IN1 and IN2. Each node except for the leaf nodes 8 to 15 have associated values of IN1 and IN2. For example, the values of IN1 and IN2 for the node 2 are IN1=6 and IN2=1, representing maximum input bandwidths from the nodes 4 and 5 respectively.

Further listed are numbers BW which are located in squares below the circles that represent the nodes. Each value of BW represents the total bandwidth of the TDs in the respective node as described with reference to FIG. 4. For example, the value of BW for the node 6 is BW=5.

Figure 6:
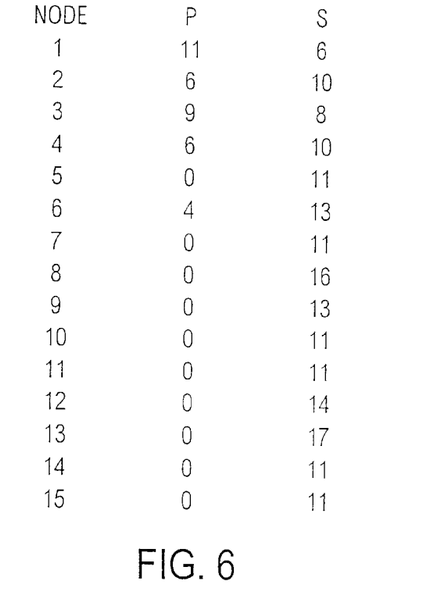
FIG. 6 is a table listing the additional data for the tree structure of FIG. 5.

The values of P and S are stored in a table or list in accordance with the present invention as illustrated in FIG. 6. For example, the values for node 1 are P=11 and S=6. Although the values of MAX can be additionally stored as an alternative embodiment of the invention, they are redundant because they are equal to the sum of the stored values of P and S. It will be noted that the values of P for the leaf nodes 8 to 15 are all zero.

The values of P and S are used for interrupt polling signal bandwidth allocation in accordance with the present invention. This arrangement enables efficient bandwidth allocation without computing maximum values for each path as in the prior art.

The parameter P represents the maximum bandwidth of the two paths entering any node (except a leaf node). For example, the node 4 has two predecessor (upstream) paths, more specifically from the nodes 8 and 9 respectively.

The node 8 has a bandwidth of BW=6, whereas the node 9 has a bandwidth of BW=3. Since the nodes 8 and 9 are leaf nodes without any predecessor nodes, the total bandwidths of polling signals represented by TDs in these nodes is equal to the bandwidths BW of the nodes themselves.

For example, since there are no nodes upstream of the node 8, the maximum bandwidth coming out of the node 8 is equal to the bandwidth BW=6 of the node 8 itself. Similarly, the maximum bandwidth coming out of the node 9 is BW=3. These constitute the values of IN1 and IN2 for the successor (downstream) node 4, more specifically, IN1=6 and IN2 =3. The value of P for the node 4 is the maximum of IN1 and IN2, in this case P=6).

The value of S for each node is equal to the sum of the bandwidth BW of the node itself and the bandwidths of all successor nodes of the node. For example, the value of S for the node 4 is equal to the bandwidth BW=0 of the node 4 itself, plus the sum of the bandwidths BW of the nodes 2 and 1, more specifically 0+4+6=10.

It will be noted that the value of BW for a given node can be calculated as being equal to the value of S for the given node minus the value of S for its successor node. For example, the bandwidth BW=4 of the node 2 is equal to S=10 for the node 2 minus S=6 for the node 1.

Assuming that a peripheral unit has been added to and detected by the system 10, the transfer descriptor TD representing the interrupt polling signal for the new peripheral unit must be added to some node in the system 10. First, the level at which the TD is to be added must be determined. The level is determined by the polling signal period which is required, and is supplied to the controller 16 by the peripheral unit when it is first connected to the system in accordance with the USB standard.

For example, if the new peripheral unit must be polled every 8 milliseconds, the TD for the unit will be added to one of the nodes 8 to 15. In accordance with the present invention, the TD will be added to the node (one of the nodes in the case of a tie) which has the lowest total bandwidth MAX.

The maximum bandwidth for any node is represented by the value MAX for the node, and can be calculated as the sum of P+S. For example, the maximum bandwidth P of the paths entering the node 3 from the nodes 6 and 7 is the largest of the values of IN1=9 and IN2=3, or P=9. The maximum bandwidth leaving the node 3 is equal to S=8. Thus, the maximum bandwidth MAX for any path passing through the node 3 is the sum of P=9 and S=8 or MAX=17.

The path having maximum bandwidth is that for which the value MAX for each node is equal to the value MAX for the root node 1. In the example of FIG. 5, the path having the maximum bandwidth MAX=17 is that for the interrupt signal INT5 which passes through the nodes 13, 6, 3, and 1.

The method by which the present system 10 allocates bandwidths to the nodes of the binary tree structure will be described with reference to FIGS. 7 to 11.

Figure 7:
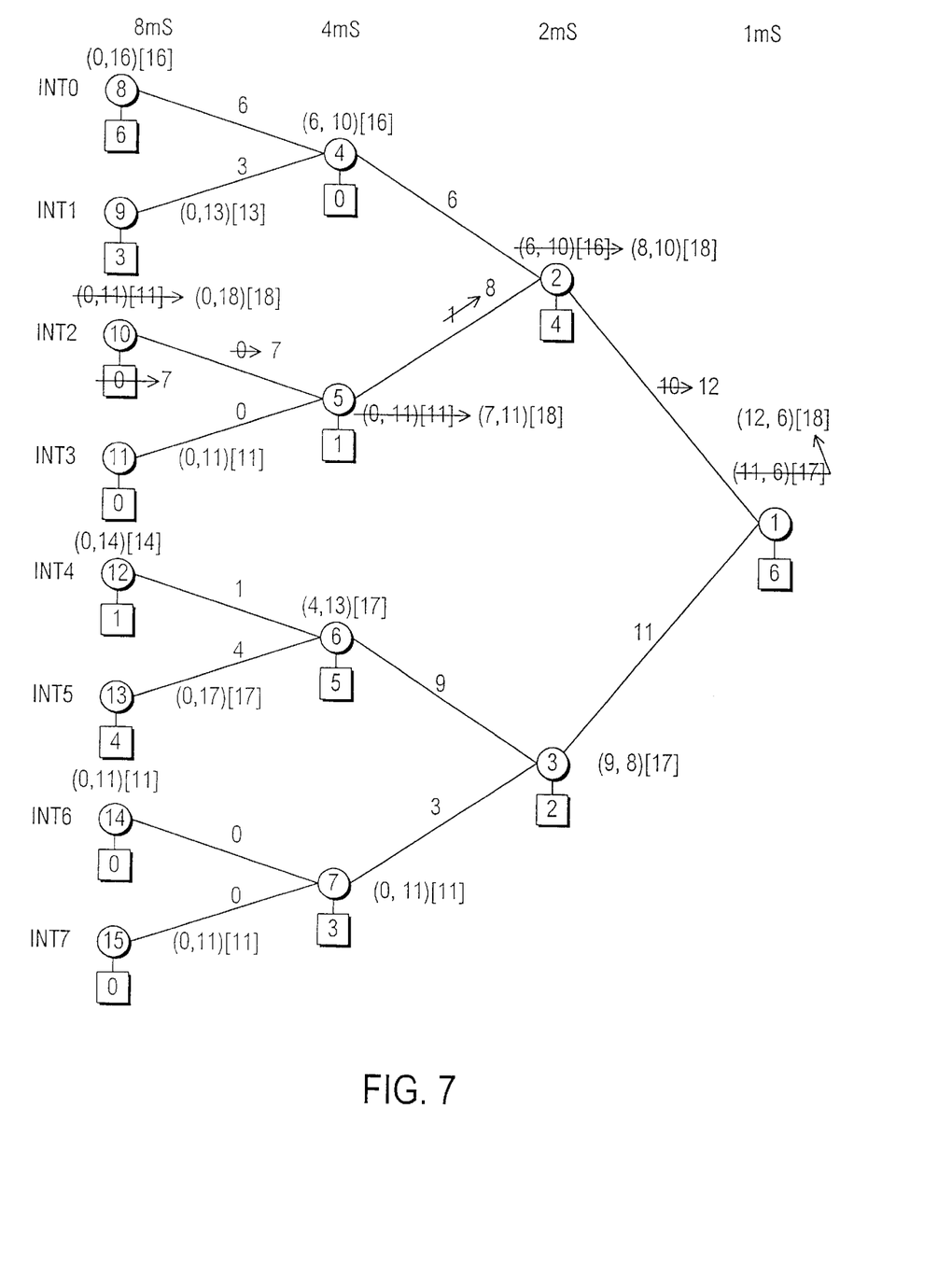
FIGS. 7 and 8 are diagrams illustrating the tree structure of FIG. 5 as being altered to accommodate newly added peripheral units having different bandwidths to the USB bus.

In FIG. 7, it will be assumed that a new peripheral unit is being added to the system 10, and requires interrupt polling every 8 milliseconds. This requires that the unit be allocated to one of the nodes 8 to 15 in the fourth level of the tree. It will be further assumed that the new peripheral unit has a bandwidth of (7) units.

Figure 9:
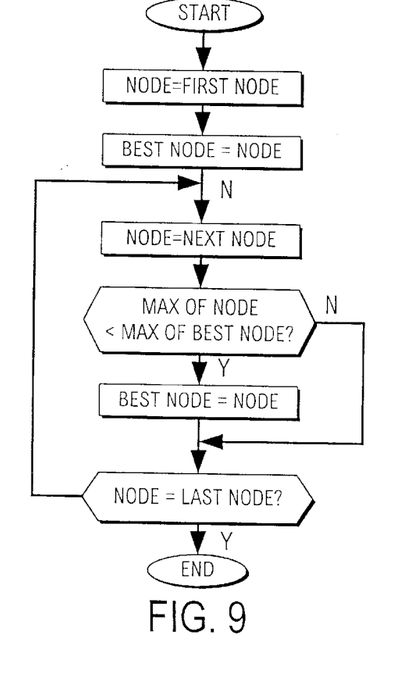
FIG. 9 is a flowchart illustrating how a node is selected for adding a new peripheral unit.

The procedure for selecting the node for the new unit is illustrated in the flowchart of FIG. 9. First, a counter NODE for the current node is set to the first node in the designated level, in this case the node 8 in level 4. A variable BEST NODE is set to the value of NODE.

Then, the method enters a loop in which the value of NODE is incremented, and the value of MAX for the current NODE is compared with the value of BEST NODE. The result of the procedure is that the value BEST NODE is returned as the number of the node having the lowest value of MAX.

If several nodes have the same lowest value of MAX, the procedure of FIG. 9 returns the number of the lowest numbered node having the lowest value. However, the invention is not so limited, and any other criterion can be used to "break a tie", such as selecting a node at random.

In the example of FIG. 7, the procedure of FIG. 9 is used to examine the value of MAX for the nodes 8 to 15 in succession. The lowest numbered node having the lowest value of MAX=11, in this case the node 10, is selected for adding the TD for the new peripheral unit. It will be noted in this example that the nodes 10, 11, 14 and 15 all have a value of MAX=11.

Thus, the TD for the new peripheral unit has been added to the node 10, which increases the BW of the node 10 from BW=0 to BW=7. In FIG. 7, values which are altered are indicated by arrows that have bases passing through the old values, and heads pointing to the new values.

In accordance with an important feature of the present invention, bandwidths can be allocated to the system by considering only a few values, more specifically the values of MAX for the nodes of the level at which a peripheral is to be added, and altering only a few values as will be described in detail below.

As further illustrated in FIG. 7, after the value of BW for the added TD in the node 10 has been updated, it is necessary to update values of P and S as required. As will be described in detail below, the value of bandwidth which was added to a node is added to the values of S for the node itself and all predecessor nodes. Since the node 10 does not have a predecessor node, the bandwidth (7) of the newly added TD is only added to the original value S=11 of the node 10 itself to produce a new value S=18.

Figure 11:
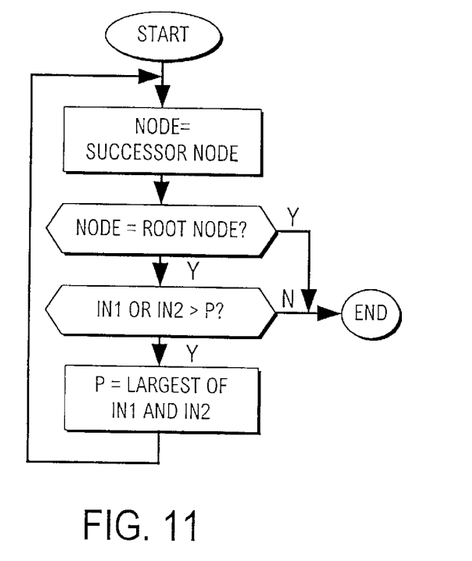

FIG. 11 illustrates how the values of P for successor nodes are altered or updated as necessary. The procedure loops through the nodes from the altered node through its successor nodes, updates the values of P for the successor nodes if required, and terminates when the root node has been processed or a node has been found which does not require alteration of its value of P.

In FIG. 7, the new bandwidth for the node 10 is BW=7, which increases the value of IN1 for its successor node 5 from IN1=0 to IN1=7. The other predecessor node 11 of the node 5 was not changed, and produces a value IN2=0.

Since the previous value of P for the node 5 was P=0, and this value is smaller than the largest of the values of IN1=7 and IN2=0, the value of P for the node 5 is increased to P=7.

It will be noted that the value of IN1 or IN2 for a given node is equal to the sum of the values of P and BW for the respective predecessor node. For example, the value of IN1=9 for the node 3 is equal to the sum of P=4 and BW=5 for the node 6.

To continue the updating process, increasing the value of P for the node 5 from 0 to 7 increases the value of IN1 for the successor node 2 from 1 to 8. More specifically, the value IN1=8 for the node 2 is equal to the sum of P=7 and BW=1 for the node 5. Since this value is greater than the previous value of P=6, the value of P for the node 2 is increased from P=6 to P=8.

The value of IN1 for the node 1 has been similarly increased from IN1=10 to IN1=12. Since this is larger than the previous value of P=11 for the node 1, the value of P for the node 1 is increased from 11 to 12. Since the node 1 is the root node, the process is ended.

It will be noted that the value of MAX for the node 1 has been increased from MAX=17 to MAX=18. This means that the maximum bandwidth for any path through the tree has been increased by one bandwidth unit.

Further, the maximum bandwidth path has been changed. The previous maximum bandwidth path was for INT5 (nodes 13,6,3 1), whereas the new maximum bandwidth path is for INT2 (nodes 10,5,2,1).

Figure 8:
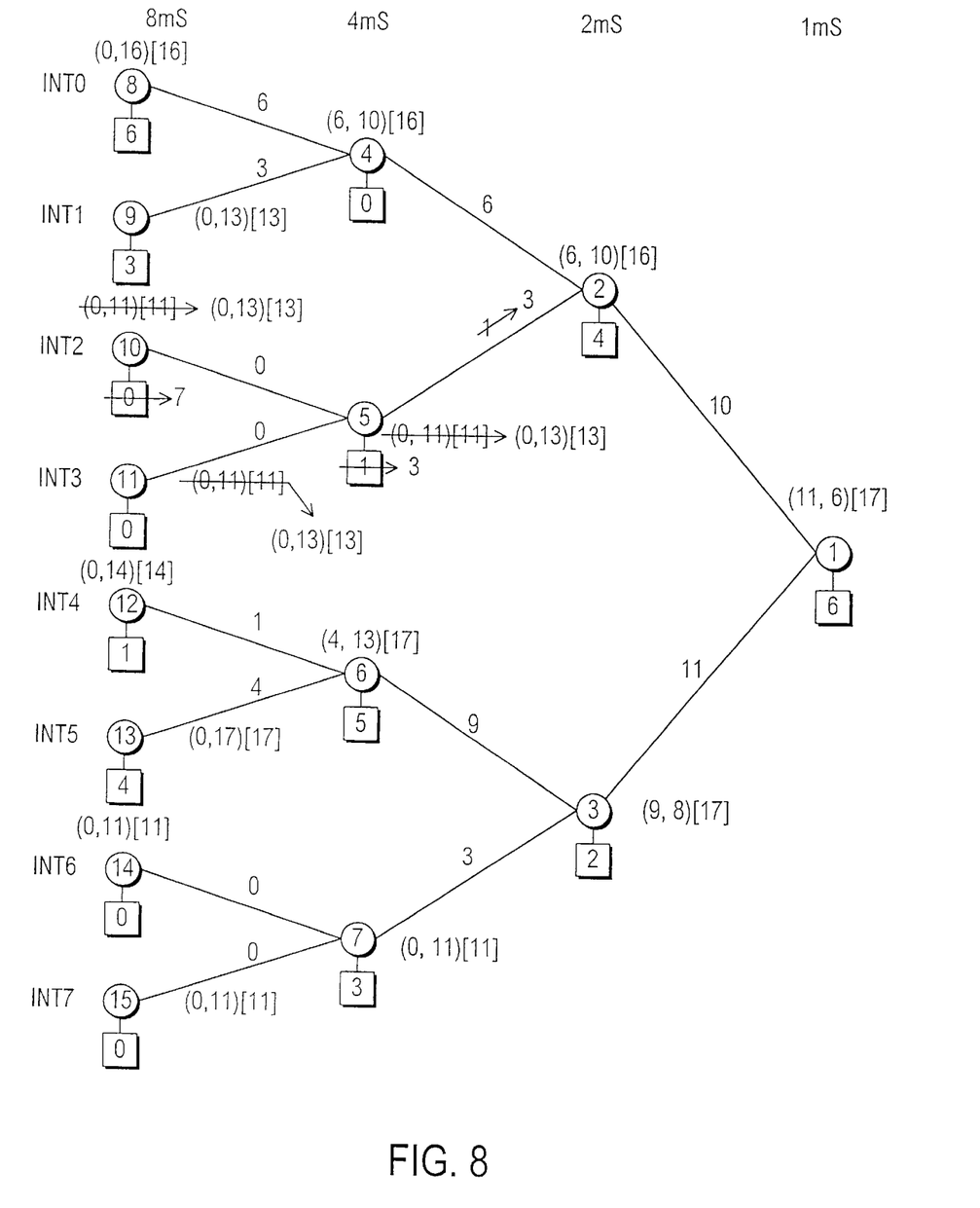
Figure 10:
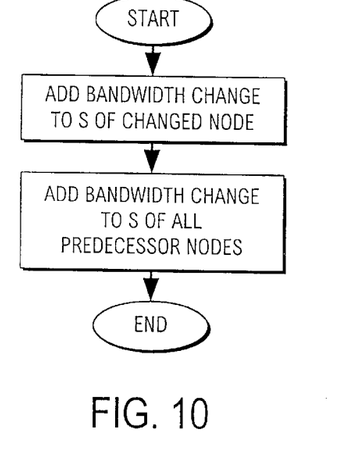
FIGS. 10 and 11 are flowcharts illustrating how the table of FIG. 6 is altered after a new peripheral unit is added.

FIG. 8 illustrates another example in which the values of S for a changed node and all of its predecessor nodes are altered in accordance with the flowchart of FIG. 10. This was not done in the example of FIG. 7 because the altered node was a leaf node.

In FIG. 8, a TD having a bandwidth value of (2) is to be added to level 3 which consists of the nodes 4 to 7. The lowest numbered node having the smallest value of MAX= 11 is the node 5. Thus, the new TD is added to the node 5, increasing the bandwidth BW of the node 5 from BW=1 to BW=3.

The bandwidth increase of 2 units is added to the value of S for the node 5, increasing the value of S from S=11 to S=13. The increase of 2 units is also added to the values of S for the predecessor nodes 10 and 11, producing new values of S=13 for both of the nodes 10 and 11. All predecessor nodes of an altered node (in this case only two predecessor nodes) are updated by adding the increase to their values of S.

After updating the predecessor nodes, the successor nodes are updated as required. The new value of BW=3 for the node 5 produces an increased value of IN2=3 for its successor node 2. However, this value is smaller than the previous value of P=6 (IN1 from the node 4), and for this reason the value of P for the node 2 is not changed.

When a node is reached for which its value of P is not changed, no successor nodes of this node are altered. Thus, only limited updating of successor nodes is generally required in accordance with the present invention.

The values of P and S are advantageously updated with a low level of computational complexity in accordance with the present method. If a node at a level M is changed and there are L levels in the tree, the number of predecessor nodes (including the node itself) that need to be updated is $2^{(L-M+1)-1}$. The maximum number of successor nodes that have to be updated is M-1.

Movement between a node and a predecessor or successor node is facilitated by a simple numerical relationship between the node numbers as illustrated in the drawings. The number of a successor node is equal to the number of a given node divided by 2, with any remainder dropped. For example, the successor node of node 4 is ½=node 2. The successor node of node 5 is 5⁄2=node 2.5 (also node 2).

The node numbers of predecessor nodes are equal to the number of a given node times two, and the node number of the given node times 2 plus 1. For example, the predecessor nodes of node 2 are 2×2=node 4, and (2×2)+1= node 5.

Figure 12:
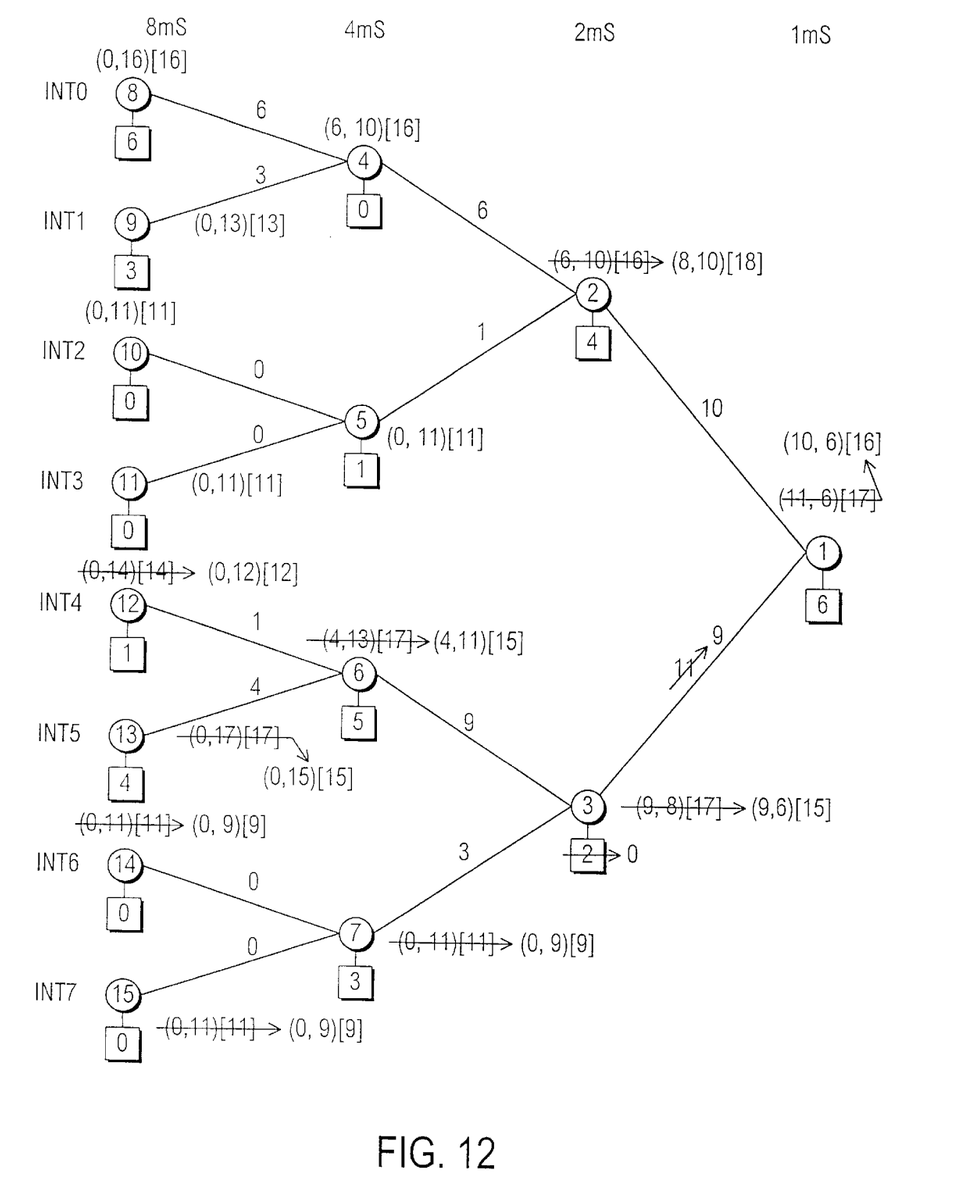
FIG. 12 is similar to FIGS. 7 and 8, but illustrates deletion of a node.

FIG. 12 illustrates how the present system can be used to recalculate the values of P and S when a peripheral unit is removed. In the illustrated example, a TD having a bandwidth of (2) units is removed from the node 3, such that the new bandwidth of the node 3 is changed from BW=2 to BW=0.

The values of P and S are recalculated using the same procedure described above for adding a peripheral unit. The only difference is that a negative number, in this case −2, is algebraically added to the previous values of P and S to compute the new values.

For example, the new value of S for the node 3 is 8−2=6, the new value of MAX for the node 3 is 17−2=15, and the new value of IN2 for the node 1 is 11−2=9. The recalculations for the other nodes are also illustrated in FIG. 12.

It will be noted that the present system 10 can also be used to reallocate bandwidths if a peripheral unit is removed. For example, after a unit is removed, the remaining unit in the same level having the largest value of MAX can be moved to the node in the same level having the smallest value of MAX. The procedure for updating a tree to reflect a removed peripheral is the same as that for adding a unit, except that the bandwidth of the removed unit is subtracted from the values of P and S rather than being added thereto as in the case of an added unit.

In summary, the present invention overcomes the drawbacks of the prior art by providing a structure and method for allocating bandwidths in a Universal Serial Bus (USB) which operates on only a limited portion of a polling list tree structure, and thereby substantially reduces the complexity and computer system time required for bandwidth allocation.

Various modifications will become possible for those skilled in the art after receiving the teachings of the present disclosure without departing from the scope thereof.

I claim:

1. A computer system, comprising:

a computer;

at least one peripheral unit;

a signal bus connecting the computer to the at least one peripheral unit; and a controller configured to send periodic polling signals to the at least one peripheral unit, each polling signal having a specified bandwidth, the controller including;

an allocation unit configured to allocate bandwidths to a plurality of nodes in a polling list, each node being capable of storing at least one descriptor representing a respective polling signal;

the nodes being arranged in a tree structure having a plurality of leaf nodes, a root node, and at least one level of intermediate nodes which are successor nodes for the leaf nodes and predecessor nodes for the root node;

the allocation unit being configured to store variables P and S for each node, where P is a maximum bandwidth of polling signals entering a node from predecessor nodes, and S is a sum of bandwidths of polling signals represented by descriptors stored in the node and all successor nodes thereof; and the allocation unit being configured to allocate bandwidths to the nodes such that a maximum value of P+S for the nodes at each level is minimized.

2. A system as in claim 1, in which the allocation unit is configured to add a descriptor representing a new polling signal to a node in a specified level which has a minimum value of P+S.

3. A system as in claim 2, in which the allocation unit is configured to, after adding a descriptor to a node, alter values of S for the node and all predecessor nodes thereof by adding a bandwidth of the new polling signal represented by the descriptor to the values of S.

4. A system as in claim 2, in which the allocation unit is configured to, after adding a descriptor to a node, alter values of P for successor nodes thereof in accordance with the bandwidth of the polling signal represented by the descriptor.

5. A system as in claim 1, in which:
the tree structure is a binary tree structure; and
each level provides a polling signal period which is two times longer than a polling signal period of a successor level.

6. A system as in claim 1, in which:
the signal bus is a Universal Serial Bus (USB); and
the polling signals are interrupt polling signals.

7. A bandwidth allocation system configured to allocate bandwidths to a plurality of nodes in a polling list for a Universal Serial Bus, each node being capable of storing at least one descriptor representing a respective polling signal;
the nodes being arranged in a tree structure having a plurality of leaf nodes, a root node, and at least one level of intermediate nodes which are successor nodes for the leaf nodes and predecessor nodes for the root node;
the system comprising:
a storage configured to store variables P and S for each node, where P is a maximum bandwidth of polling signals entering a node from predecessor nodes, and S is a sum of bandwidths of polling signals represented by descriptors stored in the node and all successor nodes thereof; and
an allocation unit configured to allocate bandwidths to the nodes such that a maximum value of P+S for the nodes at each level is minimized.

8. A system as in claim 7, in which the allocation unit is configured to add a descriptor representing a new polling signal to a node in a specified level which has a minimum value of P+S.

9. A system as in claim 8, in which the allocation unit is configured to, after adding a descriptor to a node, alter values of S for the node and all predecessor nodes thereof by adding a bandwidth of the polling signal represented by the descriptor to the values of S.

10. A system as in claim 8, in which the allocation unit is configured to, after adding a descriptor to a node, alter values of P for successor nodes thereof in accordance with the bandwidth of the polling signal represented by the descriptor.

11. A system as in claim 7, in which:
the tree structure is a binary tree structure; and
each level provides a polling signal period which is two times longer than a polling signal period of a successor level.

12. A system as in claim 7, in which the polling signals are interrupt polling signals.

13. A computer implemented method for allocating bandwidths to a plurality of nodes in a polling list for a signal bus, each node being capable of storing at least one descriptor representing a respective polling signal;
the nodes being arranged in a tree structure having a plurality of leaf nodes, a root node, and at least one level of intermediate nodes which are successor nodes for the leaf nodes and predecessor nodes for the root node;
the method comprising the steps of:
(a) storing variables P and S for each node, where P is a maximum bandwidth of polling signals entering a node from predecessor nodes, and S is a sum of bandwidths of polling signals represented by descriptors stored in the node and all successor nodes thereof; and
(b) allocating bandwidths to the nodes such that a maximum value of P+S for the nodes at each level is minimized.

14. A method as in claim 13, in which step (b) comprises adding a descriptor representing a new polling signal to a node in a specified level which has a minimum value of P+S.

15. A method as in claim 14, in which step (b) further comprises, after adding a descriptor to a node, altering values of S for the node and all predecessor nodes thereof by adding a bandwidth of the polling signal represented by the descriptor to the values of S.

16. A method as in claim 14, in which step (b) further comprises, after adding a descriptor to a node, altering values of P for successor nodes thereof in accordance with the bandwidth of the polling signal represented by the descriptor.

17. A method as in claim 13, in which:
the tree structure is a binary tree structure; and
each level provides a polling signal period which is two times longer than a polling signal period of a successor level.

18. A method as in claim 13, in which:
the signal bus is a Universal Serial Bus (USB); and
the polling signals are interrupt polling signals.

19. A digital data storage structure which stores a computer program for allocating bandwidths to a plurality of nodes in a polling list for a signal bus, each node being capable of storing at least one descriptor representing a respective polling signal; the nodes being arranged in a tree structure having a plurality of leaf nodes, a root node, and at least one level of intermediate nodes which are successor nodes for the leaf nodes and predecessor nodes for the root node;
the computer program including instructions for performing the steps of:
(a) storing variables P and S for each node, where P is a maximum bandwidth of polling signals entering a node from predecessor nodes, and S is a sum of bandwidths of polling signals represented by descriptors stored in the node and all successor nodes thereof; and
(b) allocating bandwidths to the nodes such that a maximum value of P+S for the nodes at each level is minimized.

20. A structure as in claim 19, in which step (b) comprises adding a descriptor representing a new polling signal to a node in a specified level which has a minimum value of P+S.

21. A structure as in claim 20, in which step (b) further comprises, after adding a descriptor to a node, altering values of S for the node and all predecessor nodes thereof by adding a bandwidth of the polling signal represented by the descriptor to the values of S.

22. A structure as in claim 20, in which step (b) further comprises, after adding a descriptor to a node, altering values of P for successor nodes thereof in accordance with the bandwidth of the polling signal represented by the descriptor.

23. A structure as in claim 19, in which:
the tree structure is a binary tree structure; and
each level provides a polling signal period which is two times longer than a polling signal period of a successor level.

24. A structure as in claim 19, in which:
the signal bus is a Universal Serial Bus (USB); and
the polling signals are interrupt polling signals.

25. A structure as in claim 19, comprising an electronic memory configured to store the computer program.

26. A structure as in claim 19, comprising at least one digital recording medium configured to store the computer program.

* * * * *